(12) United States Patent
Remington et al.

(10) Patent No.: US 6,968,319 B1
(45) Date of Patent: Nov. 22, 2005

(54) ELECTRONIC BILL PRESENTMENT AND PAYMENT SYSTEM WITH BILL DISPUTE CAPABILITIES

(75) Inventors: Darren B. Remington, Issaquah, WA (US); Warren T. Dent, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/459,219

(22) Filed: Dec. 10, 1999

Related U.S. Application Data

(62) Division of application No. 08/734,518, filed on Oct. 18, 1996, now Pat. No. 6,070,150.

(51) Int. Cl.⁷ .............................................. G06F 17/60
(52) U.S. Cl. ............................ 705/40; 705/34; 705/39; 705/42
(58) Field of Search .............................. 705/40, 42, 34, 705/14, 35, 38, 41

(56) References Cited

U.S. PATENT DOCUMENTS

| | | | |
|---|---|---|---|
| 3,842,248 A | 10/1974 | Yarnell et al. | 235/156 |
| 3,852,571 A | 12/1974 | Hall et al. | 235/61.7 B |
| 4,485,300 A | 11/1984 | Peirce | 235/380 |
| 4,701,601 A | 10/1987 | Francini et al. | 235/449 |

(Continued)

FOREIGN PATENT DOCUMENTS

| | | |
|---|---|---|
| EP | 0 745 947 A2 | 5/1996 |
| WO | WO 91/16691 | 4/1991 |
| WO | WO 93/08545 | 10/1992 |
| WO | WO 96/08783 | 9/1995 |
| WO | WO 97/24680 | 7/1997 |

OTHER PUBLICATIONS

Microsoft Press Computer Dictionary Third Edition p. 240 (Microsoft Press 1997).*

(Continued)

*Primary Examiner*—Hani M. Kazimi
*Assistant Examiner*—Stefano Karmis
(74) *Attorney, Agent, or Firm*—Lee & Hayes, PLLC

(57) ABSTRACT

A bill presentment and payment remittance system is configured for use over an electronic network, such as the Internet. The bill presentment and payment remittance system allows the biller to create a bill and payment remittance information in a format specified by the biller. The biller submits the bill and associated payment remittance information by electronically transmitting it over the Internet to the consumer. The consumer authenticates that the bill did indeed come from the indicated biller. The bill is presented in a user interface which provides a line-by-line itemization of the bill, along with a predefined dispute reasons which the consumer can check to challenge particular items on the bill. The bill can then be automatically or manually adjusted to reflect any disputed amounts. Payment of the bill is preferably in the form of a "direct debit check" that is formed by the consumer software using the billing and remittance information provided in the bill to automatically name the biller as the payee. The consumer completely controls the payment authorization, specifying the amount to be paid (either partial or full), and the date for the payment to be made, and the account from which the money will be drawn. The electronic payment and any dispute criteria are associated with the payment remittance information. The payment instruction and remittance information are then transmitted in the biller prescribed format back over the Internet to the biller. In this manner, the payment remittance information is automatically returned directly to the biller in the format that the biller chooses, without intervention by the consumer. The biller executes the payment instructions sent to it electronically by the consumer by sending them onto the biller's bank.

7 Claims, 10 Drawing Sheets

U.S. PATENT DOCUMENTS

| | | | |
|---|---|---|---|
| 4,734,564 A | | 3/1988 | Boston et al. ............... 235/380 |
| 4,799,156 A | | 1/1989 | Shavit et al. ................ 364/401 |
| 4,823,264 A | | 4/1989 | Deming ....................... 364/408 |
| 4,839,504 A | | 6/1989 | Nakano ....................... 235/379 |
| 4,893,248 A | | 1/1990 | Pitts et al. ............. 364/464.01 |
| 4,905,826 A | | 3/1990 | Martin ........................ 206/286 |
| 4,949,272 A | | 8/1990 | Vanourek et al. ...... 364/464.02 |
| 4,979,207 A | | 12/1990 | Baum et al. ................. 379/112 |
| 4,992,940 A | | 2/1991 | Dworkin ...................... 364/401 |
| 5,007,084 A | * | 4/1991 | Materna et al. ............... 705/40 |
| 5,027,388 A | | 6/1991 | Bradshaw et al. .......... 379/112 |
| 5,091,868 A | | 2/1992 | Pickens et al. ............. 395/148 |
| 5,121,945 A | | 6/1992 | Thomson et al. ............ 283/58 |
| 5,197,094 A | | 3/1993 | Tillery et al. ................. 379/91 |
| 5,206,488 A | | 4/1993 | Teicher ....................... 235/380 |
| 5,220,501 A | * | 6/1993 | Lawlor et al. ................ 705/40 |
| 5,223,699 A | | 6/1993 | Flynn et al. ................ 235/380 |
| 5,229,584 A | | 7/1993 | Erickson .................... 235/375 |
| 5,265,033 A | | 11/1993 | Vajk et al. .................. 364/514 |
| 5,283,829 A | | 2/1994 | Anderson .................... 380/24 |
| 5,287,270 A | | 2/1994 | Hardy et al. ................ 364/408 |
| 5,325,290 A | | 6/1994 | Cauffman et al. .......... 364/401 |
| 5,326,959 A | | 7/1994 | Perazza ....................... 235/379 |
| 5,359,509 A | * | 10/1994 | Little et al. ................... 705/14 |
| 5,383,113 A | | 1/1995 | Kight et al. ................ 364/401 |
| 5,402,336 A | | 3/1995 | Spiegelhoff et al. ........ 364/401 |
| 5,420,405 A | | 5/1995 | Chasek ........................ 235/379 |
| 5,424,938 A | | 6/1995 | Wagner et al. .............. 364/408 |
| 5,465,206 A | | 11/1995 | Hilt et al. |
| 5,473,143 A | | 12/1995 | Vak et al. .................... 235/380 |
| 5,477,038 A | | 12/1995 | Levine et al. ............... 235/380 |
| 5,483,445 A | | 1/1996 | Pickering ..................... 705/40 |
| 5,508,817 A | | 4/1996 | Kunigami ................... 358/402 |
| 5,532,920 A | | 7/1996 | Hartrick et al. .......... 364/419.1 |
| 5,557,518 A | | 9/1996 | Rosen ......................... 364/408 |
| 5,570,465 A | | 10/1996 | Tsakanikas ................. 395/114 |
| 5,590,197 A | | 12/1996 | Chen et al. .................... 380/24 |
| 5,644,727 A | | 7/1997 | Atkins ........................ 395/240 |
| 5,649,117 A | | 7/1997 | Landry ....................... 395/240 |
| 5,652,786 A | | 7/1997 | Rogers .................... 379/91.01 |
| 5,655,089 A | | 8/1997 | Bucci ......................... 395/240 |
| 5,684,965 A | | 11/1997 | Pickering ..................... 705/40 |
| 5,699,528 A | * | 12/1997 | Hogan ......................... 705/40 |
| 5,761,650 A | | 6/1998 | Munsil et al. ................ 705/34 |
| 5,832,460 A | | 11/1998 | Bednar et al. ................ 705/27 |
| 5,842,185 A | * | 11/1998 | Chancey et al. .............. 705/40 |
| 5,848,400 A | | 12/1998 | Chang ......................... 705/35 |
| 5,884,284 A | | 3/1999 | Peters et al. .................. 705/30 |
| 5,884,288 A | | 3/1999 | Chang et al. ................. 705/40 |
| 5,903,881 A | | 5/1999 | Schrader et al. ............. 705/42 |
| 5,963,924 A | * | 10/1999 | Williams et al. ............. 705/40 |
| 5,963,925 A | | 10/1999 | Kolling et al. ............... 705/40 |
| 5,974,146 A | | 10/1999 | Randle et al. ................ 380/24 |
| 5,978,577 A | | 11/1999 | Rierden et al. ............. 395/610 |
| 5,978,780 A | | 11/1999 | Watson ........................ 705/40 |
| 6,026,374 A | | 2/2000 | Chess |
| 6,058,373 A | | 5/2000 | Blinn et al. |
| 6,373,950 B1 | | 4/2002 | Rowney |

OTHER PUBLICATIONS

Title 15, Chapter 41 United States Code Section 1666 at http://www4.law.cornell.edu/uscode/15/1666.text.html.*

"Putting a Charge Into Electronic Bill Payments"; Aug. 28, 1996, Bank Network News, vol. 15, No. 7; p. 3.

"Toward Better Bill–Payment Processing", Apr. 1996; Bank Technology News, vol. 9, No. 4, p. 10.

"E–Bill Customers Over the Internet", Jan. 8, 1996, Twice, vol. 11, No. 1; p. 142.

"Visa to Offer Electronic Bills", Jul. 17, 1995; Interactive Age; vol. 2, No. 19; p. 4.

Anonymous, "Another Player Enters the Bill Presentment Game (Online Resources & Communications teams with Electronic Funds & Data Corp and American Payment Systems to develop online bill presentment and bill payment service)", Report on Home Banking & Financial Services, v 2, n 12, p 3, Mar. 28, 1997.

Anonymous, "Bold moves (First Data Corp and Microsoft Corp are forming bill–pay and bill–presentment company, challenging Visa, Integrion and Checkfree)", Cards International, n 181, p. 5., Jul. 31, 1997.

Anonymous, "Billers Benefit When the Bill's Not in the Mail", Bank Network News. V. 15, N. 8, pp 4–5, Sep. 11, 1996.

Jones, D., "CHAPS–ring around the city", Journal: Banking World, vol. 1, No. 5, p. 11–13, Nov., 1983.

"Sterling Commerce Announces New Consumer Payment Consolidation Software for Banks; Vector: Biller Lets Banks Solve Costly Manual Handling of Consumer Payment", Business Wire, p09160262, Sep. 16, 1996.

Large, Jack, "Which Method Should You Settle For?", Corporate Finance; London, Sep. 1997.

Mullin, Rick, "The Upward Evolution of Batch Automation", Chemical Week, vol. 161 Issue 37, p39, 2p, 1 graph, 4c, Oct. 6, 1989.

Zabback et al., "Office Documents on a Database Kernel–Filing, Retrieval, and Archiving–", Database Research Group, Dept. of Computer Science Swiss Federal Institute of Technology, CH–8092 Zurich, pp. 261–270.

PR Newswire, "Template Software Strengthens Core Product Family With Ease–of–Use and Functional Enhancements that Promote Unparalled Software Reuse", Dialog File 621, Access No. 01544425, Jun. 23, 1997.

Richard K. Crone, "Who Does MSFDC Really Serve?", Dialog File 696, Access No. 00581887, v 3, I 25, Dec. 16, 1997.

Business Wire, "Just in Time Solutions Introduces BillCast Family of Products for Open Internet Billing", Business Wire, May 18, 1998.

Brown, Bob; "TI, SW Bell Unite in EDI Billing Trial," The American City, Aug., 1963.

Vandenengel. Gerry; "Cards on the Internet—Advertising on a $3 Bill," World Card Technology, Feb., 1995, pp. 46–48.

"A Different Drummer on the Data Highway," American Banker, May 12, 1995, 2 pages.

Meredith, Robin; "Internet Bank Moves Closer to Virtual Reality," USA Today, May 5, 1995.

Strassel, Kim A.; "Dutch Software Concern Experiments With Electronic 'Cash' in Cyberspace," The Wall Street Journal, Apr. 17, 1995.

Rosen, Nick; "Cash Just Isn't Flexible Enough," Daily Express, Feb. 10, 1995.

Piskora, Beth; "Debit Cards Seen Poised for New Markets," American Banker, Mar. 7, 1995.

Bank, David; "Cash, Check, Charge—What's Next?," Seattle Times, Mar. 6, 1995, 4 pages.

Cortese, Amy; "Cyberspace—Crafting software that will let you build a business out there," Business Week, Feb. 27, 1995, 7 pages.

Sirbu, Marvin and Tygar, J. D.; "NetBill: An Internet Commerce System Optimized for Network Delivered Services," Engineering and Public Policy Dept. and Computer Science Dept., Carnegie Mellon University, Pittsburg, Pennsylvania, Feb. 27, 1995, pp. 1–12.

Kutler, Jeffrey; "Cash Card Creator Looking Beyond Mondex," Feb. 9, 1995.

Post, David; "E–Cash: Can't Live With It, Can't Live Without It," The American Lawyer, Mar. 1995, pp. 116–117.

Gullo, Karen; "Electronic Bill Payment," American Banker, Jan. 27, 1992.

"Management Utility Billing," Jul./Aug. 1979, 5 pages.

Myers, Edith; "Banking on PCs," Datamation, 6 pages.

Gullo, Karen; "Citicorp Device is Called Pivotal for Home Banking," American Banker, Mar. 1, 1990.

"Newsnet Reference Guide 1994," Newsnet Inc., 945 Haverford Road, Bryn Mawr, PA 19010.

Palmer, James A. and Gaj, Steven J.; "Consolidated Third Party Collections," Dept. of Veterans Affairs Medical Center, Brecksville, Ohio, Mumps Computing, Jun. 1997, pp. 12–16.

Briere, Daniel and Chris Finn; "Footing the Bill," Network World, v9n21, May 25, 1992.

White, George C.; "Consumer Bill Payment—"Front End" Overview," White Papers, Inc., Apr. 22, 1992, 3 pages.

Pence, Daniel M.; "TV Answer," Electronic Payment Products, TV Answer, Inc., Reston. Virginia, 9 pages.

"New Technologies in Consumer Bill Payment," Scanfone by US Order, 9 pages.

Mila, Paul J., Director of Operations; "Online Resources," McLean, Virginia, 4 pages.

Pope, Dennis J., Asst. Vice President, EFT Project Manager, Manufacturers Hanover Trust Company, New York, New York, 5 pages.

White, George C.; "Bill Payment Initiation From Retail Stores," White Papers, Inc., Apr. 22, 1992, 2 pages.

"System and Method for Paying Bills Electronically," 7 pages.

Manelski, Dr. Dennis; "Bill & Pay Minitel–Consumer Bill Payments Overview," Minitel USA, 880 $7^{th}$ Ave., New York, NY, Apr. 22, 1992.

"More Diversity; Information Services Stress Partnerships," Communications Daily,v12n124, p. 2, Jun. 26, 1992, 2 pages.

"Account Acquisitions," A/S/M Communications, Inc., ADWEEK, May 3, 1993.

Youngblood, Dick, Staff Writer; "Some hung up about paying bills via computer," Star Tribune, Minneapolis, MN, May 23, 1993, 3 pages.

Alexander, Steve; "Community Link to shift its marketing focus from masses to special interest," UMI Inc., Aug. 13, 1993, 3 pages.

Oslund, John J., Staff Writer; "Ready to Score—Big Game Offers US West a Chance to Show Off New Information Service," Star Tribune, Jan. 24, 1992, 3 pages.

"Sprint Considers Single Bill," Communications Week, Dec. 24, 1990, p. 27.

Pfitsinger, William H.; "Consolidate Your Utility Bills . . . ," The American City, Aug. 1963, pp. 80–81.

"A Player Goes After Big Bucks in Cyberspace," American Banker, May 5, 1998.

Orr, Bill; "Electronic Bill Paying shows Signs of Soaring," ABA Banking Journal, May 1997, pp. 42, 47–48, 50.

* cited by examiner-

ELECTRONIC BILL PRESENTMENT AND PAYMENT SYSTEM WITH BILL DISPUTE CAPABILITIES

This is a divisional of U.S. patent application Ser. No. 08/734,518, filed Oct. 18, 1996, now U.S. Pat. No. 6,070,150.

TECHNICAL FIELD

Background of the Invention

Millions of consumers and businesses pay for goods and services by check. In many instances, payment is made at a point of purchase, such as during checkout at a grocery or office supply store, or following dinner in a restaurant. For these point-of-purchase cases, the payment is readily and easily associated with the goods or services provided.

Payment may also be made in response to a bill from the supplier of the goods or servers. Consumers and businesses typically write checks each month to pay bills for utilities, home mortgages and office rental, credit charge cards, and the like. In these bill payment cases, it is much more difficult to link the payment to the particular goods or services provided by the supplier, particularly in view of the shear volume of checks collected each month.

For convenience, the term "consumer" is used throughout to represent both a typical person consuming goods and services as well as a business consuming goods and services. FIG. 1 shows a traditional paper-based bill presentment and remittance system 20. At the end of a billing cycle, a biller 22 generates a bill 24 for each consumer account having a positive or negative account balance, or transactions in the billing cycle which yielded a zero balance. As used herein, a "biller" is any party that originates bills or statements for goods or services rendered to the consumer. Examples of billers are: utilities, government, merchants, and intermediate billing services such as banks.

In addition to the bill, the biller 22 creates remittance information 26 which associates the bill and any payment toward the bill with the consumer account. The remittance information 26 usually includes an account number, an account balance, an amount due, the date due, and any additional data that the biller might need to link the payment to the account. The remittance information 26 is typically in the form of a detachable stub or coupon which the consumer is requested to detach from the bill statement and return along with the payment.

The biller 22 prints the bill 24 and remittance information 26 on a paper statement, encloses the statement in an envelope, and mails the envelope to a consumer 28 using the U.S. postal service. The phase concerning preparation and mailing of the bill is referred to as the "bill presentment" phase.

To pay the bill, the consumer 28 usually writes a check 30 which directs payment to the biller 22. The payment may partially or fully satisfy the amount due in the bill. The consumer 28 also fills out payment information on the remittance stub 26, such as amount paid, payment date, and account number (if not already on the stub). The consumer 28 encloses the stub 26 and check 30 in an envelope (often, pre-addressed) and mails it back to the biller using, once again, the U.S. postal service. This phase of writing the check and mailing it back to the biller is referred to as the "bill remittance" phase.

Over 5.1 billion pieces of bill-related first class mail are mailed each month using the U.S. postal service. At a cost of $0.32 to $3.50 per piece of mail (including paper, printing and processing costs, etc.), with an average cost of $0.50, the delivery mechanism of the traditional paper-based bill presentment and bill remittance system is expensive. Remittance adds another $0.11 to $0.65 per bill. It would be desirable to reduce the delivery cost of the bill presentment and payment system.

A drawback to the paper-based system 20 is that it is out-dated in an age where most billers use automated, computer-based accounting systems and a growing number of consumers have computers which could be used to improve the bill delivery, remittance, and settlement process. It is an archaic process to require billers to generate paper bills and remittance stubs from a computerized system, rely on the consumers to manually fill out remittance information and properly return the stubs, and then enter the hand written information from the remittance stubs into the computer system to continue tracking the account. The cost to process paper-based remittance information is very high and must be incurred by the biller. For large volume operations, the remittance processing tasks of opening envelopes, scanning the account number on the payment stub (e.g. bar coded number), and MICR (Magnetic Ink Character Recognition) encoding the check amount is automated. Large volume billers may have their own automated remittance processing operation, whereas smaller volume billers have the option of contracting with services to perform these duties or performing them manually.

The biller has an incentive to reduce the cost of remittance processing. If all goes well, the cost to process each remittance is comparatively small. Not infrequently, however, errors arise in this paper-based mechanical/human system. The most common source of error rests with the consumer. The consumer might fill out the remittance stub incorrectly, or damage the stub by tearing across the bar coded account number, or simply forget to return the stub, or return the stub of another biller. When such mistakes are made, the check must be manually processed by the biller to associate the payment with the account. This dramatically increases the cost of remittance processing. In some cases, it costs the biller more to process the payment than the amount actually being paid by the consumer.

It would be desirable to create a bill presentment, remittance, and settlement system that reduces the bill delivery and remittance processing expenses, minimizes or eliminates manual resolution of remittance-incomplete check payments, and improves cash flow and funds predictability.

One prior art solution to reduce the amount of paper handling are so-called "direct debit" payment systems in which routine payment amounts are automatically debited from the consumers bank account and credited to the biller's bank account on agreed transaction dates. These systems are used for routine payments, such as monthly home mortgage payments, and can be used for payment of both fixed or variable amounts. Billers like the direct debit system because both the payment processing and remittance processing costs are very low, the error rate is very low, and the cash flow is predictable as payments are automatically made at the same time each period. Unfortunately, many consumers do not like the direct debit system. Complaints registered by these consumers include a lack of control over their own bank accounts and the difficulty of correcting mistakes made by the direct debit system, due to a consumer changing bank accounts or biller accounts. More specifically, the consumers are concerned with loss of control over the payment date and amount of the debit. In some businesses (such as credit card companies), it might be inappropriate to impose certain payment amounts in which significant revenues would be lost if consumers paid the full amount of the bill every month.

With the growing popularity and use of personal finance computer software, some electronic-based payment systems have been proposed to alleviate the problems plaguing the traditional paper-based system. In general, these electronic systems are directed primarily to the bill payment phase, with little innovation to the bill presentment phase. Many of these systems still rely on the U.S. mail for delivery of the bills, and in many cases the return of payment instructions.

FIG. 2 shows a prior art electronic Bill Payment Service Provider (BPSP) system 40 operated by companies like CheckFree Corporation, Intuit Services Corporation, and VISA Interactive. The BPSP system 40 includes a biller 42, a consumer 44, a BPSP services unit (BSU) 46, BPSP bank 48, a biller bank 50, a consumer bank 52, and ACH (Automated Clearing House) network 54, and potentially other payment networks like RPS (Remittance Processing Service). The lockbox operation of processing payment remittances is performed by either the biller, or a third party designated by the biller. In the illustrated implementation, a third party concentrator (CT) 56 processes payment remittances, although the bank 50 itself may also be designated to perform the lockbox operation.

The ACH network is a nationwide system that processes electronic payments on behalf of depository financial institutions. The ACH network represents approximately 15,000 of the 20,000 financial institutions in the United States. Although best thought of as a single network, the ACH network actually consists of four interconnected networks owned and operated by four ACH operators: the Federal Reserve, VISA, New York ACH (which provides regional coverage in New York), and Arizona Clearing House in conjunction with Deluxe Data (which provides regional coverage in Arizona). The ACH network is well-known in the art.

The methods for presenting and paying bills via existing BPSP systems 40 is illustrated as a series of enumerated steps. The biller 42 sends a paper bill 60 through the US mail to the consumer 44 (step 1). To pay the bill 60, the consumer 44 sends payment instructions to the BPSP services unit 46 by computer, or by telephone using an interactive voice response system (step 2). At this point, the BPSP services unit 46 has several choices:

1. Laser Draft. Print a laser demand check drawn on the consumer's account at the consumer bank 52 and send the laser demand check to the biller 42 or concentrator 56. This process is illustrated as step 5, option D.

2. Partial Electronic. With this choice, the consumer account is debited via the ACH network 54 (step 4), but payment is remitted using a check—either a bunch of payments lumped together as a check and list (step 5, Option C) or a single payment drawn on the BPSP bank account for the amount the consumer owes the biller (step 5, Option D).

3. Full Electronic. The consumer account is debited via the ACH network 54 (step 4) and payment is made via the ACH network (Step 5, Option A) or other network, such as the RPS network (step 5, Option B).

U.S. Pat. No. 5,383,113 to Kight et al., which is assigned to CheckFree Corporation, describes a system and method for determining which of the three choices to make for different situations.

Assuming that a choice for partial or full electronic payment is made, the BPSP services unit 46 prepares ACH-ready and other payment instructions to its bank 48 (step 3). Using the ACH instructions, an ACH debit transaction from the consumer bank account 52 is performed through the ACH network 54 (step 4). This ACH debit transaction effectively moves the authorized finds from the consumer bank account 52 to the BPSP bank 48.

At this point, a number of different options can be taken to transfer payment from the BPSP bank 48 to the biller bank 50 or the concentrator 56. One possibility is to perform an ACH credit transaction through the ACH network 54 from the BPSP account at bank 48 to the biller bank account 50 (step 5—option A). Another possibility is to perform an RPS credit transfer from the BPSP account at bank 48 to the biller bank account 50 or concentrator 56 (step 5—option B). A third option is for the BPSP bank 48 to produce a single aggregated check drawn on the BPSP account and a list of all consumers making payments, and to send the check and list to the biller 42 or concentrator 56 (step 5—Option C).

The current BPSP system has several drawbacks One drawback is that it only addresses the payment phase, leaving no improvement to the bill presentment phase. For instance, the check & list option simply returns one aggregate check along with a list of paying consumers and the amounts they paid. The biller is required to go back and manually enter this information into its computer system. This yields an unacceptably high error rate and is expensive. Another drawback is that the consumer does not know ahead of time when his/her account will actually be debited. This is because the funds for bill payment are usually withdrawn from the consumer account several days before they receive posting credit from the biller. It generally takes longer to post payments made by check & list or laser draft because they are exceptions to a company's remittance procedure. This late posting periodically will result in undesired late charges to consumers.

FIG. 3 shows a prior art electronic bill payment system 90 proposed by Visa International. This system 90 is described in U.S. Pat. No. 5,465,206, entitled "Electronic Bill Pay System" issued Nov. 7, 1995. The Visa system 90 includes a biller 92, a consumer 94, a biller bank 96, a consumer bank 98, a settlement bank 100, and a payment network 102. The payment network 102 is described in the patent as being the VisaNet® network.

A method for presenting and paying bills using the Visa bill pay system 90 is illustrated as a series of enumerated steps. The biller 92 sends a bill 104 by U.S. mail or email (step 1). The bill 104 includes a unique biller reference number (BRN). To pay the bill 104, the consumer 94 transmits to consumer bank 98 a transaction indicating an amount to pay, the source of funds, a date on which to make the payment, the consumer's account number with biller, and the biller's BRN (step 2).

The consumer bank 98 submits an electronic payment message to biller bank 96 via the payment network 102 (step 3). The payment message includes a bank identification number for consumer bank 98, a bank identification number for biller bank 96, the biller's BRN, the consumer's account number with biller, an amount to be paid, and an implicit guarantee of consumer bank 98 to provide funds to cover payment.

Settlement is achieved using the standard processes over the payment network, and particularly, via the VisaNet® network for Visa sponsoring banks and the RPS network for non-Visa sponsoring banks (step 4). After settlement, the biller bank 96 passes an accounts receivable (A/R) file to the biller 92 to indicate which payments were received by the biller bank on behalf of the biller (step 5). The A/R file lists individual payments received in correlation to the consumer accounts numbers.

The Visa bill pay system 90 has a limitation in that the biller has little or no control over the format concerning how the bill is presented to the consumer or how the remittance information is to be returned. Instead, the biller conforms to requirements imposed by Visa and accommodates a format of the A/R file received from the biller bank. While it may be possible for the biller and biller bank to agree on a data format for the little amount of data included in the A/R file, the format cannot be independently controlled by the biller. Additionally, the biller does not have exclusive control over the type or quantity of information that is ultimately remitted back.

The limitations imposed on the biller are a result of requiring the remittance information to be routed back through the banks and VisaNet® network before it is downloaded to the biller. The information must flow from the consumer 94 directly to the consumer bank 98, then over a highly structured payment network 102 having strict rules as to format, content, timing, and so forth, and then onto the biller bank 96. As a result, the biller bank 96 only receives the data supported by the VisaNet® network, and is thus restricted to only this data for inclusion in the A/R file to be downloaded to the biller.

It is further noted that all of the above electronic systems in FIGS. 2–3 have a drawback in that the biller must send a paper bill, or an electronic message, that conforms at least in part to requirements imposed by the supporting system. The biller is not free to create its own format and appearance for the bill, nor is the biller free to create the content and format of the remittance information.

It would be advantageous to devise a bill presentment and payment system that enables the biller to directly control the format for presenting the bill, the format for receiving any remittance information, and any other content to be sent to the consumer.

Another design consideration for a bill presentment and payment system is that many billers already have established sophisticated, expensive accounting systems. It would be beneficial to devise a bill presentment and payment system that integrates smoothly with entrenched accounting systems so that companies are not required to change their traditional ways of practice.

SUMMARY OF THE INVENTION

This invention concerns a bill presentment and payment remittance system for use over an electronic network, and particularly the Internet. The bill presentment and payment remittance system allows the biller to create a bill and payment remittance information in any desired format the biller chooses. The biller submits the bill and associated payment remittance information by electronically transmitting it over the Internet to the consumer. The bill is presented to the consumer through a user interface (UI).

According to an aspect of this invention, the exact information and format contained in the bill is controlled by the biller. For example, the UI for certain types of bills can provide a line-by-line itemization of the bill, along with predefined dispute reasons which the consumer can check to challenge particular items on the bill. The bill can then be automatically or manually adjusted to reflect any disputed amounts. The UI also permits the consumer to open dialog boxes to more fully explain reasons for disputing a bill, or to change an address, or to submit other types of communication. The UI might also include advertisements and hyperlinks to target resources, such as Web sites on the Internet.

Unlike existing direct debit arrangements, the consumer is in direct control of the amount to be paid and the payment date as well as which account they wish to use to pay the bill (assuming they have more than one account). The consumer specifies the payment date and the dollar amount to be paid. The consumer can make partial or fill payment toward the bill balance. The consumer exercises control of the payment remittance process every time a payment is made. The payee, however, is automatically designated as the biller so that payment back to the biller's account is guaranteed. In this manner, the bill remittance phase is merchant initiated.

The electronic payment entered by the consumer is associated with the payment remittance information so that when the payment remittance information is returned to the biller, it will include the payment-specific data originally defined by the biller when they created the electronic bill. Payment instructions authorized by the consumer are transmitted over the Internet back to the biller or an intermediary service to initiate payment of the bill. The payment remittance information is transmitted in the biller prescribed format back over the Internet to the biller. In this manner, the payment remittance information is automatically returned directly to the biller in the same format that the biller designated, without intervention by the consumer, the carrier network, or any other intermediaries.

Accordingly, the process is beneficial to both parties. The biller initiates the payment process by submitting a bill that is designed to support automatic remittance processing while minimizing or eliminating opportunities for a payer to induce errors that would detrimentally slow the remittance processing. The consumer is in complete control of the payment timing and amount, having exclusive authority to make full or partial payment, or to forego payment altogether.

BRIEF DESCRIPTION OF THE DRAWINGS

FIG. 8 is an example illustration of a graphical user interface window showing a billing statement for a fictitious company as it arrives at a consumer's computer.

FIG. 9 is the billing statement of FIG. 8, but shown after a consumer has made adjustments for disputed items.

The same reference numbers are used throughout the figures to reference like components and features.

DETAILED DESCRIPTION OF THE PREFERRED EMBODIMENT

Figure 1:
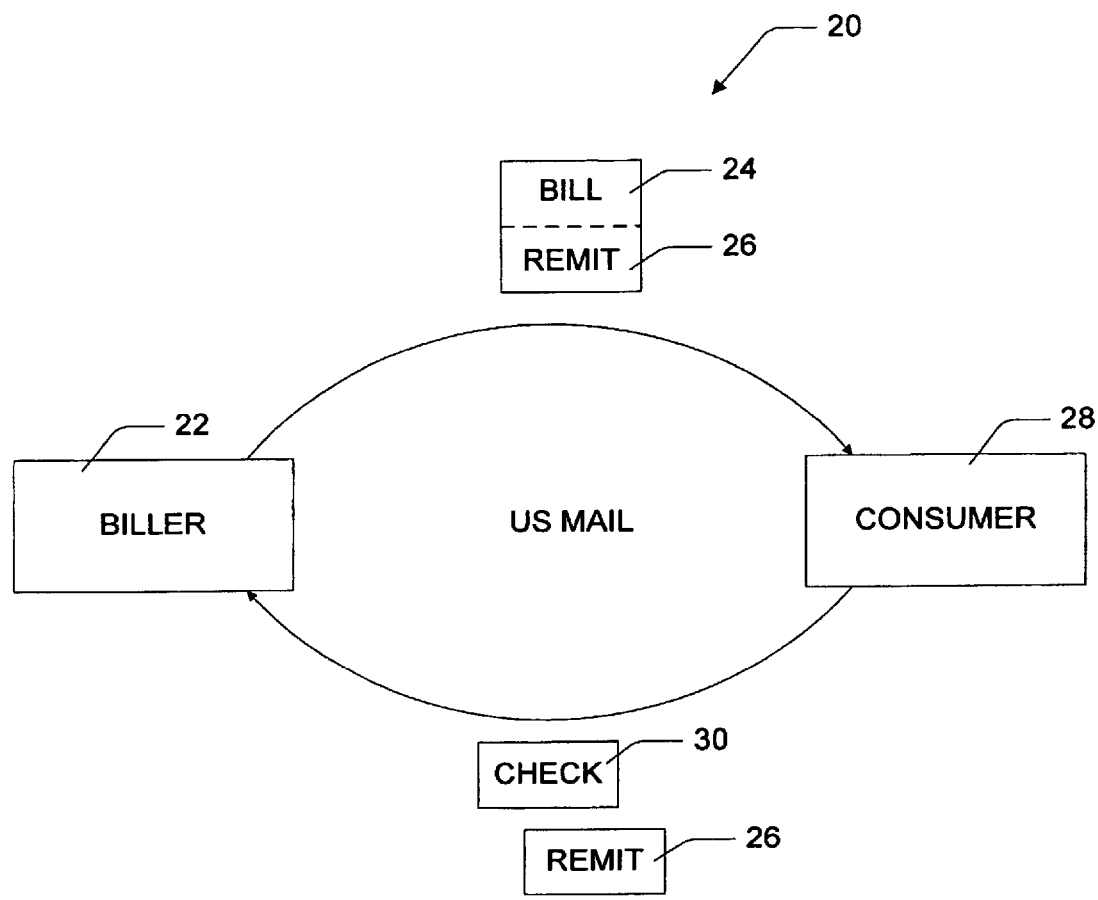
FIG. 1 is a diagrammatic illustration of a traditional paper-based bill presentment and payment system.
Figure 2:
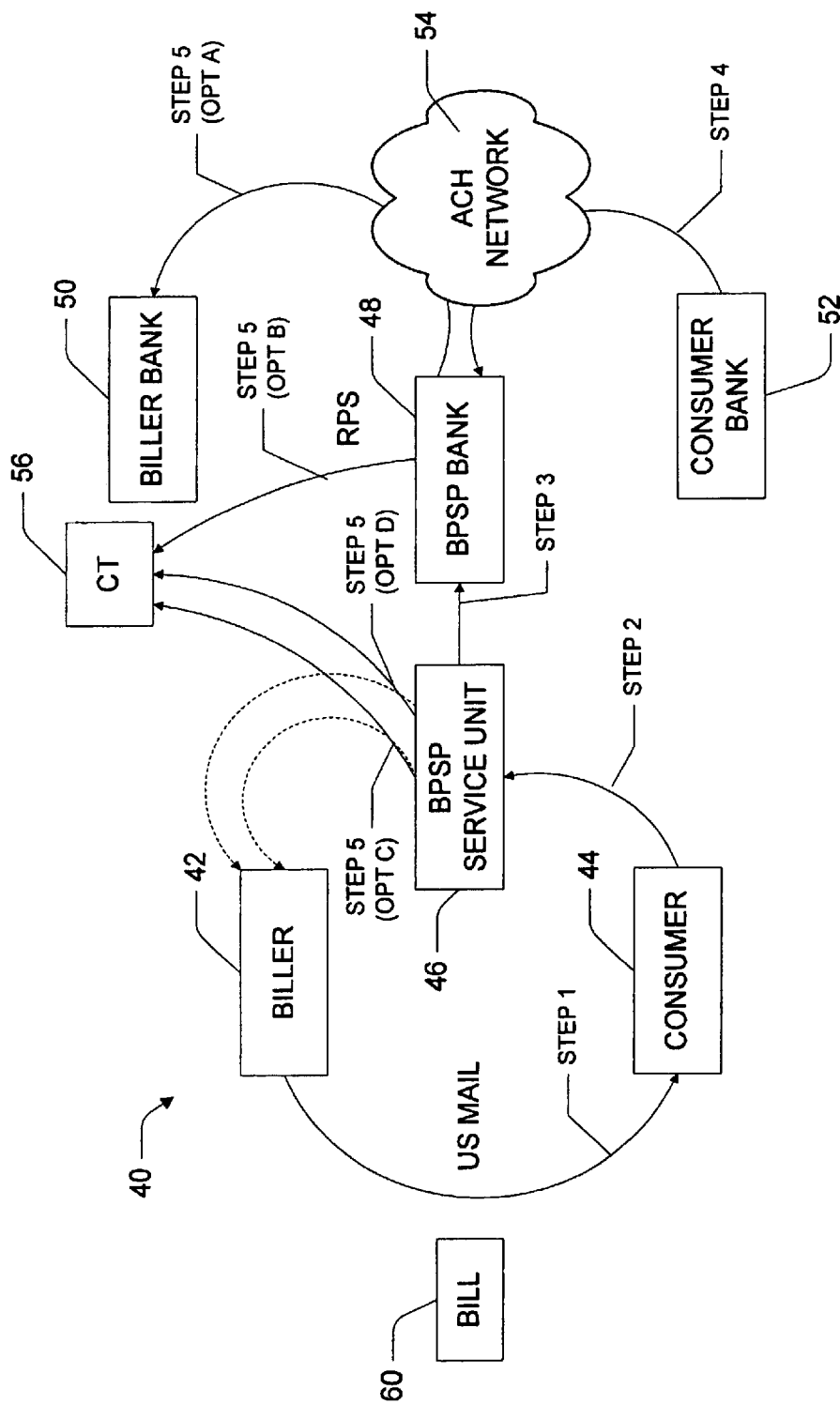
FIG. 2 is a diagrammatic illustration of a prior art electronic bill payment systems operated by companies like CheckFree Corporation.
Figure 3:
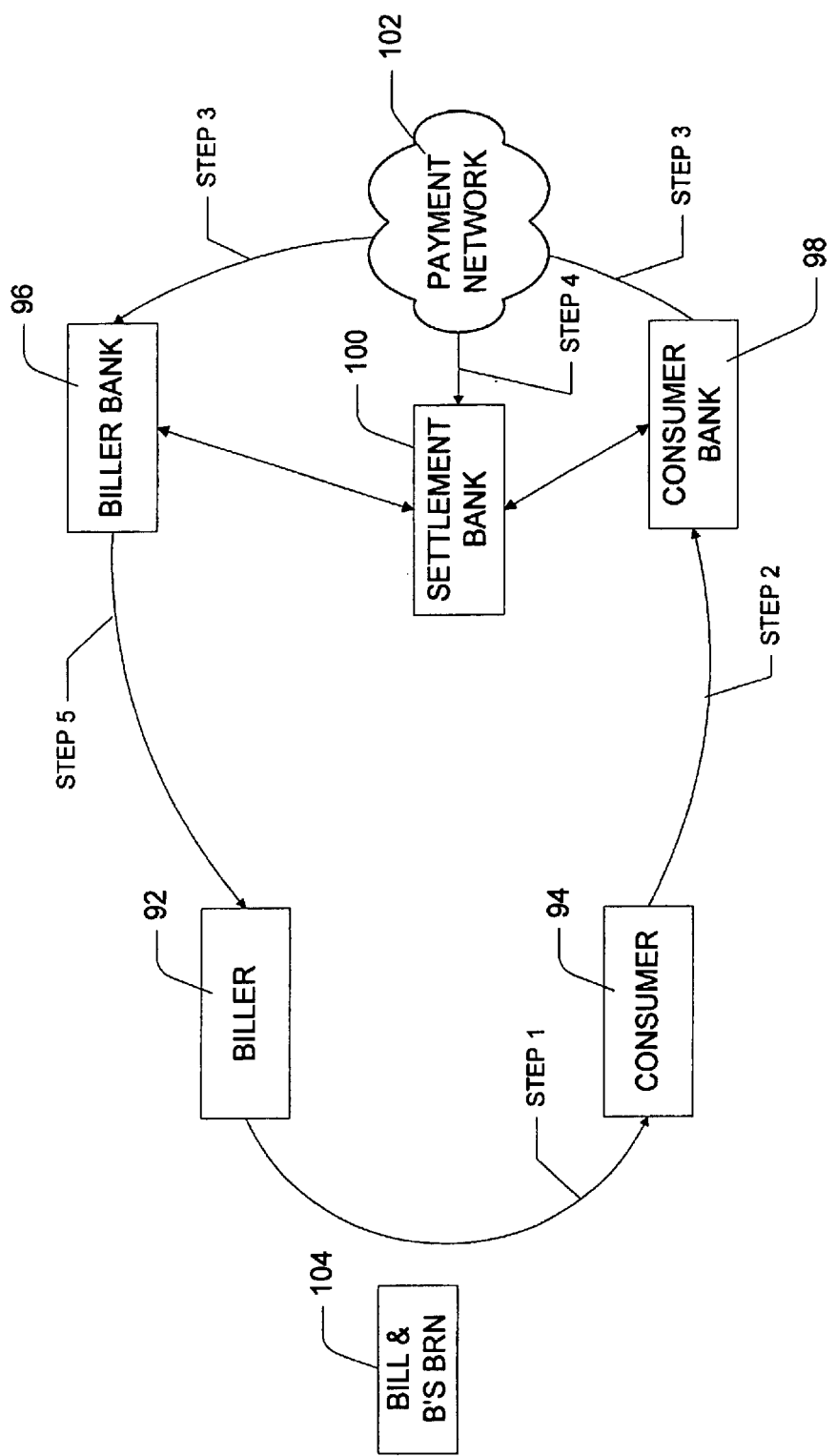
FIG. 3 is a diagrammatic illustration of a prior art electronic bill payment system proposed by Visa International.
Figure 4:
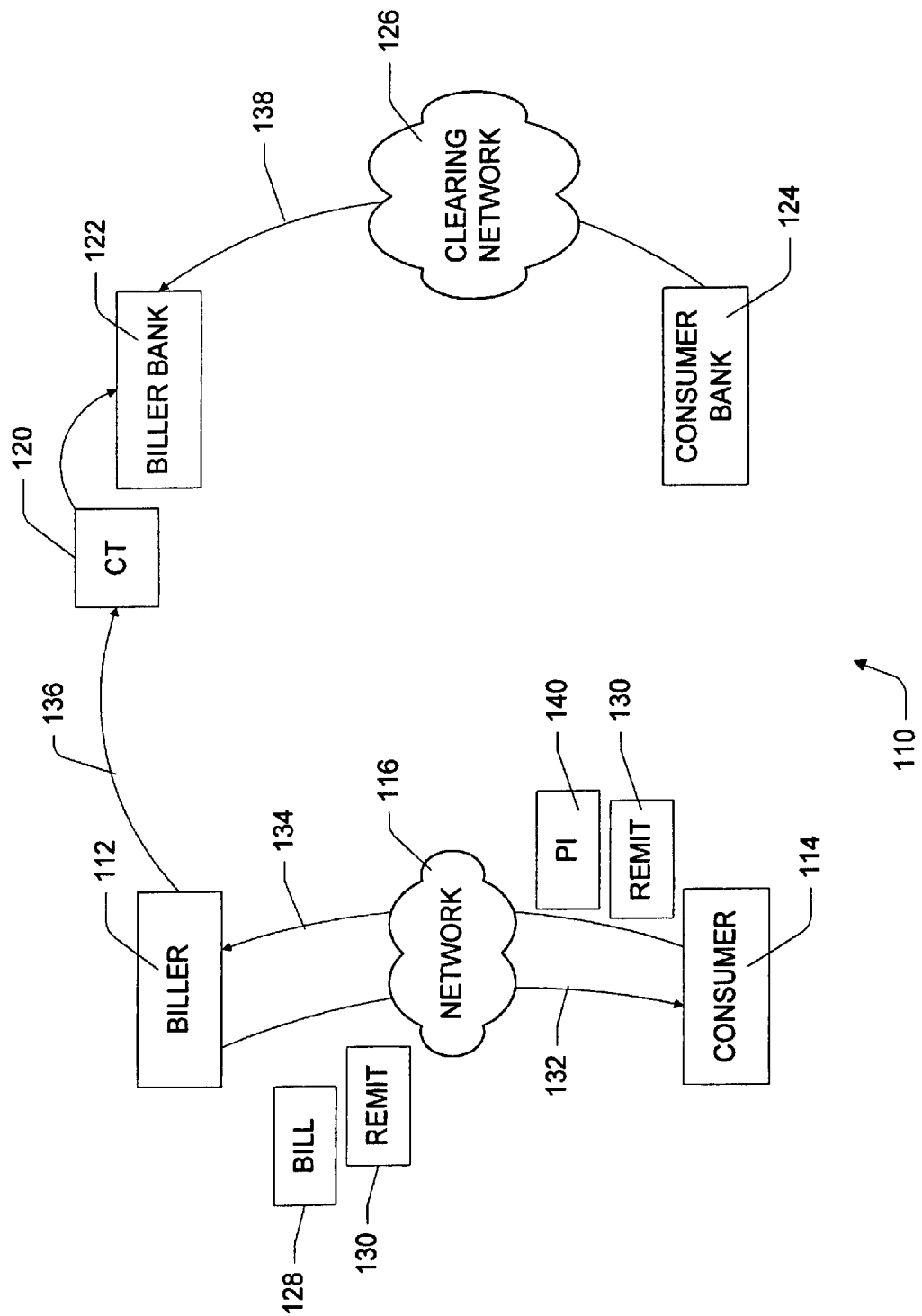
FIG. 4 is a diagrammatic illustration of a bill presentment and payment system according to one implementation of this invention.

FIG. 4 shows a bill presentment and payment remittance & settlement system 110 according to a first implementation of this invention. The system 110 includes a biller 112, a consumer 114, and a network 116. The bill presentment and payment system 110 is an electronic, computerized system having computing units at the biller 112 and consumer 114. For convenience, the pair of terms "biller" and "biller computing unit," as well as the pair of terms "consumer" and "consumer computing unit," will be used interchangeably throughout this disclosure and referenced by the same numbers. A detailed discussion of an exemplary implementation of a consumer computing unit is described below and depicted in FIG. 6.

The network 116 is an electronic data network. One preferred implementation is a public network, and particularly, the Internet. The Internet is a network formed by the cooperative interconnection of computing networks, including local and wide area networks. It interconnects computers from around the world with existing and even incompatible technologies by employing common protocols that smoothly integrate the individual and diverse components.

The bill presentment and payment system 110 includes a biller bank 122 that maintains the biller's account. In this implementation, a concentrator 120 is also illustrated to perform the lockbox operations. The lockbox functions can be performed by either the biller or a third party designated by the biller, such as the biller bank, a different bank, or another non-bank entity.

The bill and presentment system 110 further includes a consumer bank 124 which manages the consumer's account. Other depository financial institutions, such as a brokerage firm with checking privileges, may be substituted for the consumer bank 124 within this system. The biller bank 122 and consumer bank 124 are connected to a clearing network 126, such as the ACH network.

Figure 5:
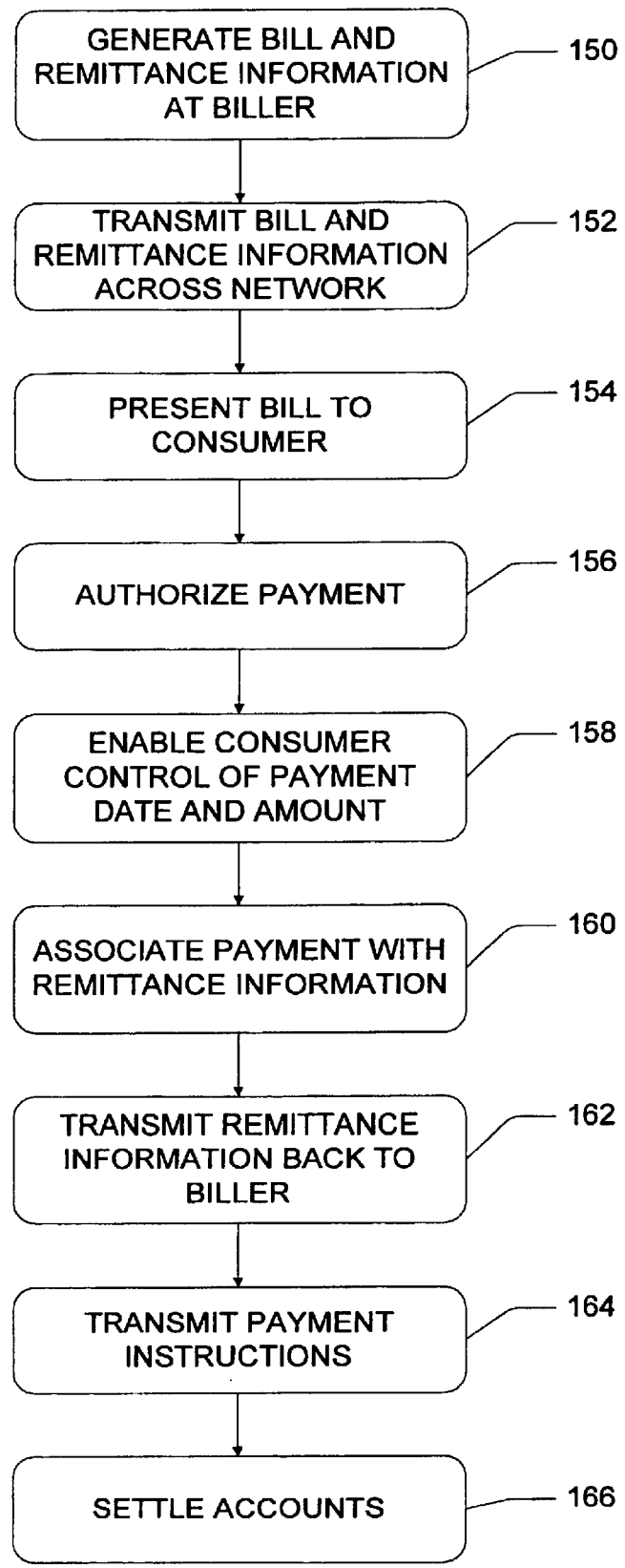
FIG. 5 is a flow diagram of a method for electronically presenting and paying bills using the FIG. 4 system.

FIG. 5 shows a method for electronically Presenting and paying bills using the system 110. As one implementation, the steps are performed in software executing at the biller computing unit 112 and the consumer computing unit 114. Other software components might also reside at the biller bank 122 (and/or concentrator 120) and the consumer bank 124.

At step 150, the biller's software executing at the biller computing unit 112 generates a bill 128 and associated payment remittance information 130 according to a format created entirely by the biller. This is advantageous because the biller can customize the bill and remittance information to include any type of data that it wants. Additionally, the bill and payment remittance information can be specifically formatted for compatibility with the biller's existing accounting software. Another advantage is that the bill can be artistically designed to present an appearance unique to the biller.

The bill 128 might be implemented simply as a static data structure which holds pertinent data related to the account and billing matters, as well as any remittance data desired by the biller. This data structure is passed between the biller computing unit and the consumer computing unit and utilized by the software components running on these computing units. The bill 128 might alternatively be constructed with additional features, such as embedded hyperlinks, pop-up dialog boxes, or pop-up advertisements. The bill 128 might further be constructed as a sophisticated application, having executable code and other features, in addition to the basic data structure. These aspects are described below in more detail with reference to FIGS. 7–10.

At step 152 in FIG. 5, the biller computing unit 112 sends the bill 128 and payment remittance information 130 across the public network 116 to the consumer computing unit 114 (as illustrated by arrow 132 in FIG. 4). The biller computing unit 112 can also include non-billing materials to the bill, such as regulatory notices, warnings, or advertisements. The biller computing unit 112 might optionally digitally sign the bill and payment remittance information before transmission. A digital signature is often used to verify the source of information on a network such as the Internet.

The consumer computing unit 114 receives the bill 128 and remittance information 130 from the network 116. In one implementation, the bill and remittance information arrive in the form of an email message or a notification for the consumer to check a billing mailbox to retrieve electronic bills. A bill presentment and payment software application residing on the consumer computing unit 114 is opened to facilitate presenting and paying the bill. This application might be opened automatically upon receipt of the bill, or in response to the consumer activating the bill email message (for example, by using a mouse to point to and double left-click on the bill message). The consumer computing unit 114 might further be configured to authenticate the biller's signature, if one is attached, to ensure that the bill is truly from the biller and not an impostor trying to covertly extract money from the consumer.

Figure 6:
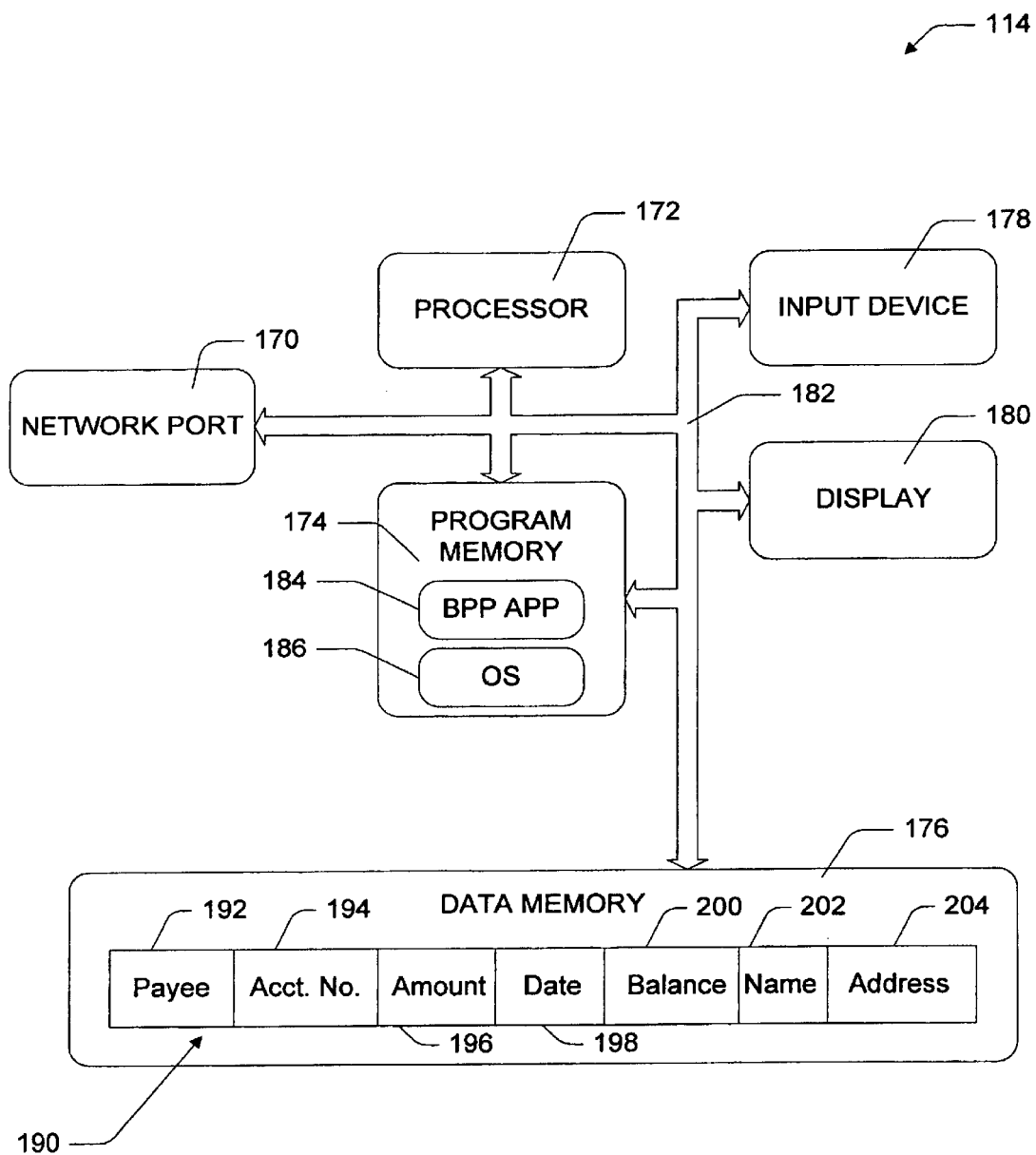
FIG. 6 is a block diagram of a consumer's computer used in the FIG. 4 system.

FIG. 6 shows the consumer computing unit 114 in more detail. It has a network port 170 which facilitates access to the network 116. The network port might be implemented, for example, as a modem for dialing up an Internet access provider, or as a network card, ISDN modem, etc. The consumer computing unit 114 also has a processor 172, a program memory 174, a data memory 176, an input device 178 (e.g., keyboard, mouse, track ball, stylus, voice recognition, etc.), and a display 180. As an example, the consumer computing unit 114 can be implemented as a conventional personal computer (PC) or portable computer. The computer components 170–180 are interconnected by an electronic interconnect structure 182 which consists of parallel and serial conductors, such as SCSI-, PCI-, and RS 232-compatible conductors. A bill presentment and payment (BPP) application 184 is stored in program memory 174 and executes on the processor 172 to implement the user-based features of the BPP system.

The consumer's computer 114 runs an operating system 186 which supports multiple applications. The operating system is stored on the memory 174 and executes on the processor 172. The operating system is preferably a multi-tasking operating system which allows simultaneous execution of multiple applications, although aspects of this invention may be implemented using a single-tasking operating system. The operating system employs a graphical user interface windowing environment which presents the applications or documents in specially delineated areas of the display screen called "windows." Each window has its own adjustable boundaries which enable the user to enlarge or shrink the application or document relative to the display screen. Each window can act independently, including its own menu, toolbar, pointers, and other controls, as if it were a virtual display device. One preferred operating system is a Windows® brand operating system sold by Microsoft Corporation, such as Windows® 95 or Windows NT™ or other derivative versions of Windows®. However, other operating systems which provide windowing environments may be employed, such as the Macintosh OS from Apple Corporation and the OS/2 Presentation Manager from IBM. The BPP application 184 runs on the operating system 186.

The bill 128 and payment remittance information 130 are received at the network port 170 and stored in data memory 176 within a data structure 190. The data structure 190 has several data fields which contain information specified by the biller and other data fields reserved to hold data entered by the consumer. Some of the data fields are static or closed fields in that the consumer is prohibited from altering the data kept in those fields. Other data fields are dynamic or open fields which allow the consumer to supply the data or alter the existing data. The specific construction of the data structure 190 is defined by the biller, with the Fig. 6 construction being one possible example.

In the illustrated example, the bill and remittance data structure 190 includes a payee data field 192 which contains the name of the payee or payment recipient. The payee is automatically set to be the biller. The payee field is closed so that the consumer cannot overwrite the payee. In this manner, the payment instructions ultimately authorized by the consumer will automatically recite the biller as the payee.

The data structure 190 includes an account identification data field 194 to hold information identifying the consumer's account to which the bill is being posted. This field is also closed to the consumer.

The data structure 190 has an open amount data field 196 and an open date data field 198 to hold a payment amount and a payment date entered by a consumer. Other data fields might also be included in the data structure, such as a closed account balance data field 200 which reflects the current balance owed by the consumer and a closed consumer name data field 202 which holds the consumer's name.

The data fields are organized according to a particular format prescribed by the biller. Some of the fields are canonical, such as the date due and amount—so that the system can readily "know" about these fields. Other fields—like itemized details, past payments, etc.—are defined by the biller and are semantically transparent to the system. Some of these data fields are used as the payment remittance information to be returned to the biller. Preferably, the remittance information contains at least the account number from data field 194, the amount paid which is held in amount data field 196 and the date payment is to be made which is held in date data field 198. The data structure 190 might also include a biller address data field 204 to hold a network address of the biller. This address is used to route the designated payment remittance information back to the biller, as is described below in more detail. Optionally, depending on security requirements of the particular biller, a digital certificate of the consumer authorizing the payment would also be returned back to the biller to enable authentication of the payment instruction.

At step 154 of FIG. 5, the BPP application 184 residing on the consumer's computing unit 114 presents the bill 128 to the consumer via the display 180. The BPP application 184 gathers presentation data from the bill data structure 190 and displays the presentation data within a unique graphical user interface designed by the biller. The bill 128 also contains structured data in addition to presentation data. Structured data is not used in the viewable display rendering of the bill, but remains hidden as part of the bill file. Examples of structured data includes remittance data, transactions details, and the like.

The biller controls what information and the particular format that the bill is presented to the consumer. The bill may be formatted in a particular manner that allows the remittance information to seamlessly integrated with the biller's reconciliation process. The bill may define the nature, semantics, and format of other information/data items that the biller would like returned as part of the electronic remittance in addition to the standard data used to reconcile a statement For example, the biller might like to collect from the consumer items of dispute, comments, advertising responses, response forms (e.g., signing up for a new service), purchasing (e.g., buying something advertised), and the like.

Figures 7, 10:
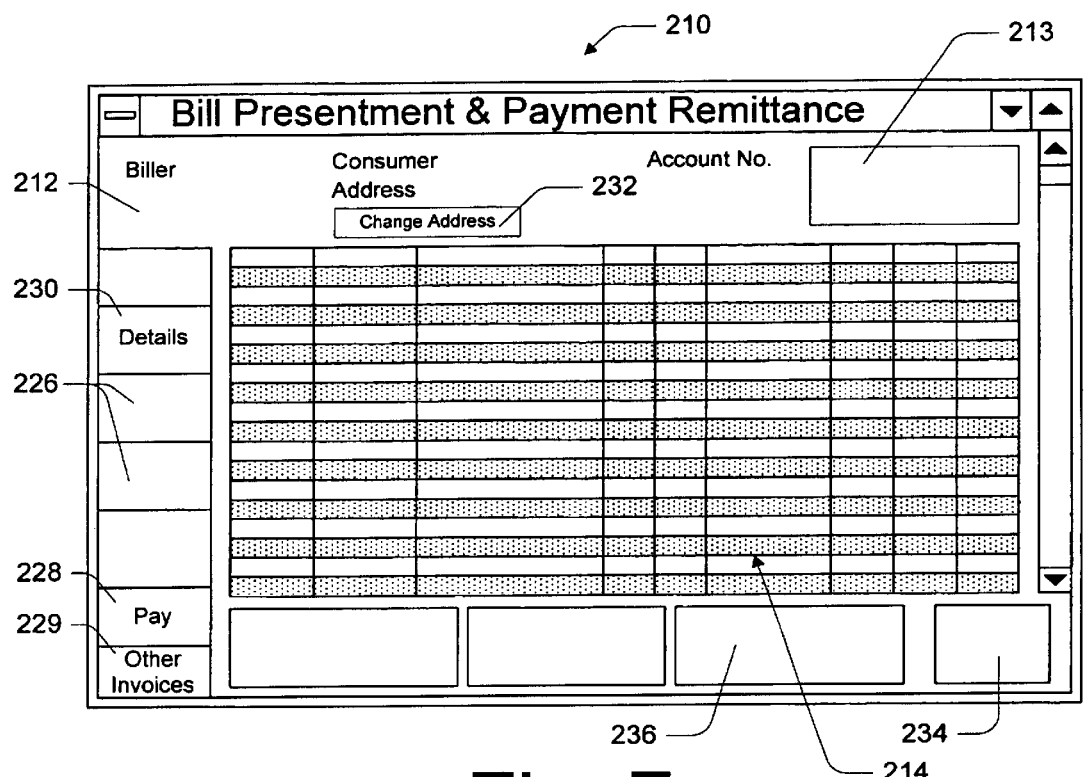
FIG. 7 is a diagrammatic illustration of a graphical user interface window of a bill presentment and payment application executing on the consumer's computer, showing an example format for presenting a bill to a consumer.
FIG. 10 is a diagrammatic illustration of a graphical user interface window of an implied check that is presented to the consumer as part of the payment process.
Figures 8, 9:
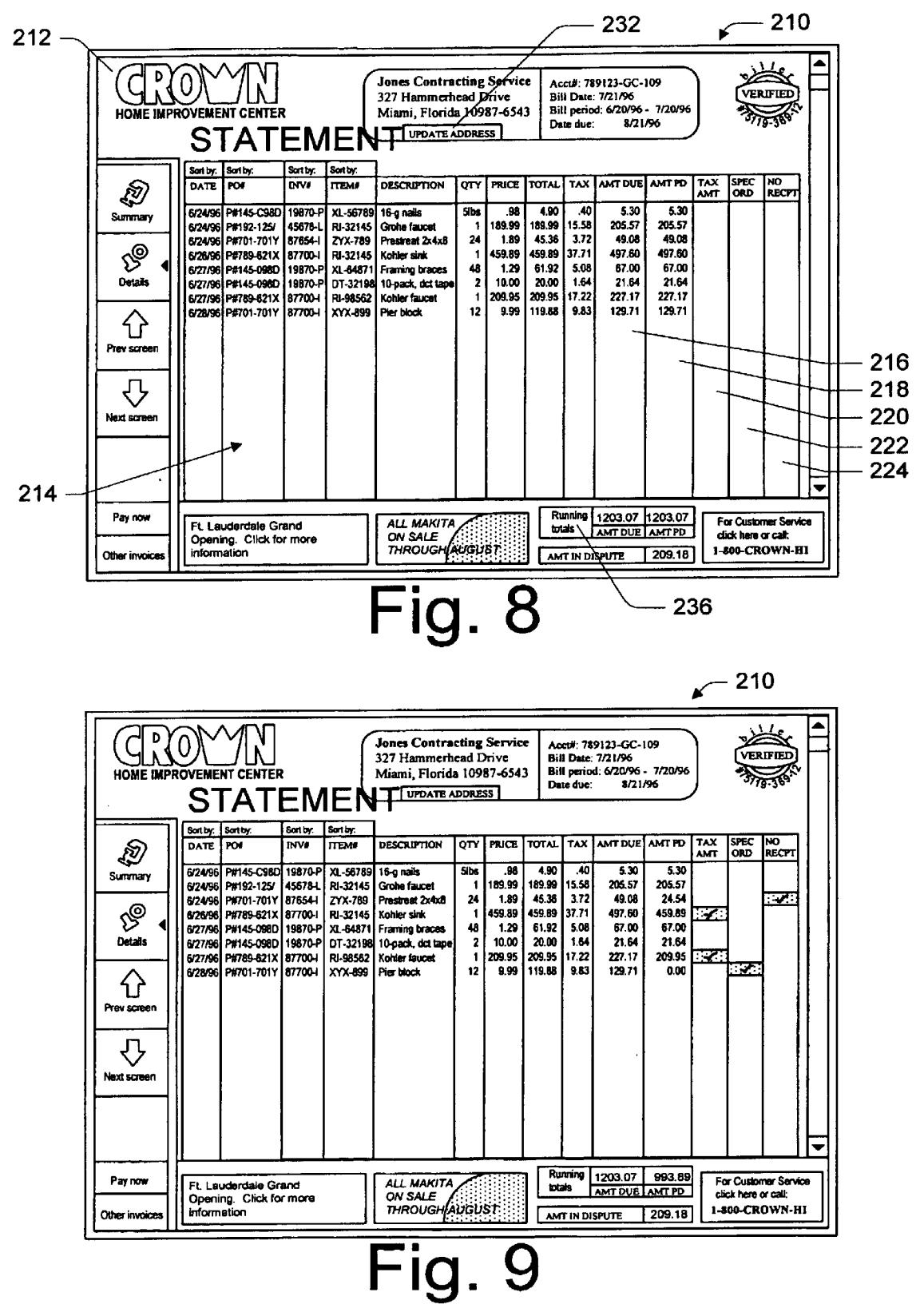

FIG. 7 shows a spatial outline of one example bill presentment graphical user interface (UI) screen 210 which organizes and aesthetically presents the presentation data from the bill. FIG. 8 shows a realistic example of the bill presentment UI screen 210 showing a billing statement for a fictitious company Crown Home Improvement Center. The UI screen is generated by the BPP application 184 and shown on the display 180 to present the bill to the consumer. In this example, the bill presentment UI 210 has a banner stripe 212 across the top of the screen to show the biller's name, logo, address, telephone number, and any other business or vanity information about the biller. The banner strip 212 also includes the consumer name and account number, or other relevant data pertaining to the consumer. The banner strip may also be partitioned to allow re-use of parts of the bill interface for third party advertising purposes, as represented by partitioned area 213.

The bill presentment UI 210 has a main body portion 214 which contains the billing particulars, such as the line items, the individual amounts for each item, and a total amount due and payable. In the FIG. 8 example, the main body portion 214 lists individual line items for each purchase at Crown Home Improvement Center, with each line item containing the purchase date, purchase order number, invoice number, item number, description of item, quantity, price, total, tax, and amount due.

One of the features of the bill presentment UI 210 is that it provides an easy forum for the consumer to evaluate and challenge certain portions of the bill. It is common that a consumer might want to challenge a line item on the bill. For instance, the bill might include a tax on an item that is used for a non-taxable purpose; or the bill might include an item that has not yet been received by the consumer, or the bill might include an item that the consumer returned. Under present practices, if a consumer wishes to dispute part of the bill or remove an item, the consumer must call the billing company and discuss the matter with a representative, and/or possibly submit a written letter explaining why the bill is inaccurate. This technique is time consuming, inconvenient to the consumer, expensive for the biller, and can induce errors if the partial payment submitted by the consumer is not properly matched up with the appropriate items being paid and those items being challenged.

The bill presentment UI 210 can be constructed with appropriate controls which enable a user to dispute an item. As an example, the bill presentment UI 210 might contain additional columns which categorize pre-set reasons for challenging a billing items, such as tax exempt status, or the product has not been received, or the item has been returned, or payment was previously made, and so forth. With this arrangement, the consumer simply places a "mark" in the appropriate column adjacent to the item. Upon insertion of the mark, the bill presentment UI 210 dynamically adjusts the bill to reflect the consumer's challenges. The bill contains both dynamic data, which can be modified by the consumer inputs, and static data which cannot be modified.

FIGS. 8 and 9 show an example of the line item feature in the billing statement for Crown Home Improvement Center. FIG. 8 shows the billing statement as it originally arrives at the consumer. The billing statement includes an "amount due" column 216 which lists the amount due for each item purchased from Crown (e.g., the quantity purchased times the prices per unit, plus tax) and an "amount paid" column 218 which lists the amount paid for each item. When the bill arrives, the data in the amount paid column 218 is dynamic data which is initially set equal to the static data found in the amount due column 216.

Next to these columns are three columns of pre-arranged dispute reasons for non-payment or partial payment of an item. The dispute columns include a "tax exempt" column 220 which is checked if the item should not have been taxed, a "special order" column 222 which is checked if the product has been ordered but not yet received, and a "no receipt" column 224 which is checked if the consumer has not yet received the goods. With this bill format, the consumer can examine each purchase, line by line. If the consumer desires to challenge an item, the consumer simply clicks or otherwise selects the appropriate column cell.

FIG. 9 shows the bill presentment UI 210 after the consumer has disputed four of the items. Upon clicking the appropriate cell, the bill presentment UI 210 places a visible "check mark" in the appropriate cell. Where possible, the bill presentment UI 210 automatically adjusts the amount paid column 218 to reflect the disputed amount. For example, when the consumer checks the tax exempt column 220 and the bill presentment UI 210 automatically deducts the tax from the amount paid column 218. In some cases, however, the consumer inputs the corrected amount paid to reflect the disputed amount. In this example, the consumer deducted part of the amount due for one-half of an order in which the consumer has not received the goods.

The bill might also be designed to enable a consumer to open a dialog box in conjunction with a disputed item. The consumer can write a detailed explanation for the challenge in the dialog box. When the consumer finishes and closes the dialog box, the text is saved and included in the remittance information to be returned to the biller.

The ability to check predefined reasons for disputing a particular item of the bill, or to enter an explanation electronically through a dialog box, significantly improves the efficiency of communication between the biller and consumer, and potentially reduces or eliminates wasteful non-electronic communication between them. Additionally, since the disputes are automatically associated with the particular billing item, the process leads to a more efficient remittance process.

With reference again to FIG. 7, the bill presentment UI 210 has multiple softkeys or buttons 226 which form tabbed navigation points to enable different functions within the BPP application 184 or to facilitate quick movement from one section of the bill to another. One example softkey is a "pay" button 228 which allows a consumer to activate a payment remittance graphical UI screen, an example of which is shown in FIG. 10. Another is a "Details" tab 230 which jumps to the itemized details of the particular bill. FIG. 8 shows an example set of buttons, including a bill summary tab, a details tab, a previous screen tab, a next screen tab, a pay now button.

The bill presentment UI 210 also includes an "other invoices" button 229 which, when activated, pops up a list of other invoices. Upon activation of the "invoices" button 229, the bill presentment UI 210 cycles among multiple bills from the same or different billers. For example, the consumer might wish to bundle all of the bills received each month and pay them at the same time.

Other softkeys may be disposed at other places in the bill UI 210. For instance, a "change of address" button 232 is positioned in the banner 212. Upon activation of this button, a dialog box appears atop the UI 210 for the consumer to enter a new address. This new information is returned to the biller along with the remittance information to update the biller's records. Since the data fields are predefined by the biller, the biller software can be configured to receive the change of address and automatically update the consumer's address.

An example of another softkey is a customer service button 234 which, upon activation, dials a customer services representative over the Internet. The consumer can then initiate an online discussion with the customer services representative.

In addition to softkeys, the bill presentment UI 210 might further include executable hyperlinks which are supplied as part of the bill from the biller. The hyperlinks can be inserted anywhere, and are set off in conventional fashion by boldface type, graphical icon, and/or underlining. A consumer activates or "follows" a hyperlink by clicking on or otherwise selecting the icon or keywords. Activating a link causes the biller UI to initiate another application, such as an Internet Web browser, to retrieve and render the document or resource that is targeted by the hyperlink.

Consider the following examples of embedded hyperlinks. A bill statement for a cable television service provider might include a hyperlink to a video trailer for an upcoming movie. The consumer activates the link and a remote server retrieves the video trailer from the target resource and sends the video file to the consumer computer for display. As another example, a bill statement might include a hyperlink which invites the consumer to purchase items that are on sale. As another example, a bill statement for an automobile lease might contain an advertisement of a new vehicle with a hyperlink to a target resource containing more information about the vehicle.

The bill presentment UI 210 containing hyperlinks is constructed using a "markup language." "SGML" (Standard Generalized Markup Language) is one such language, defined formally as "a language for document representation that formalizes markup and frees it of system and processing dependencies." SGML is a language for describing the structure of documents and for describing a tagging scheme to delineate that structure within text. Documents compatible with the world wide web or "WWW" or "Web" utilize a subset of SGML called "HTML" (Hypertext Markup Language). An HTML textual document can be thought of as plain text that contains formatting instructions in the form of HTML markup codes or "tags." Tags tell rendering software (e.g., Web browsers) how to render and print documents, and are also used to specify hyperlinks.

In concept, the target of a hyperlink can be virtually any type of object—including executable programs, text or multimedia documents, sound clips, audio segments, still images, computers, directories, and other hyperlinks. In WWW documents, hyperlink targets are most often files that can reside on any computers connected to the Internet. However, a hyperlink target can also be a particular location within a document, including the document that is currently being rendered.

Hypertext usage is not limited to the Internet. Various multimedia applications utilize hypertext to allow users to navigate through different pieces of information content. For instance, an encyclopedia program might use hyperlinks to provide cross-references to related articles within an electronic encyclopedia. The same program might also use hyperlinks to specify remote information resources such as WWW documents located on different computers.

At step 156 in FIG. 5, the consumer is granted complete control to authorize payment of the bill, assuming the bill is in order. After the consumer has reviewed each item and made all of the adjustments, the bill presentment UI 210 shows a summary block (referenced as number 236 in FIG. 8) with the total amount due, the total amount to be paid by the consumer following adjustments, and the total amount in dispute. The consumer activates the "pay" button 228, which calls the payment remittance graphical UI screen.

FIG. 10 shows an example payment remittance UI screen 240. In this example, the payment remittance UI 240 resembles a customary check having the consumer's name and/or account number, a date line, a payee line, a dollar amount line, a written amount line, and a signature line. The payee line is automatically filled in using data from the closed payee data field 192 of the data structure 190 stored in the consumer's computer memory. This line cannot be altered by the consumer, which is advantageous from the biller perspective because the check is akin to a direct deposit in that the authorized payment is assured to go to the biller's account.

However, unlike a direct debit arrangement, the consumer is in direct control of the amount to be paid and the payment date (step 158 in FIG. 5) as well as which account they wish to use to pay the bill (assuming they have more than one account). The consumer can make partial or full payment toward the bill balance. In one implementation, the payment date line of the payment remittance UI 240 initially defaults to the date that the consumer depressed the "pay" button 228 on the bill presentment UI 210. Additionally, the dollar amount line of the payment remittance UI 240 initially defaults to the amount to be paid in summary 236 provided in the bill presentment UI 210, which reflects any adjustments made by the consumer. However, the consumer can override these defaults by entering a different payment date and dollar amount using the payment remittance UI 240. This information is stored respectively in the payment date data field 198 and the amount data field 196 of the data structure 190. If desired, the payment date can be configured to default to the date payment is actually due, with the ability for the consumer to override the date. Empowering the consumer with complete control of the payment amount and date is advantageous from the consumer perspective. The consumer feels in control of the payment process, in the same manner as writing personal paper checks. The payment remittance information to be returned to the biller is automatically prepared when the consumer fills in the payment UI 240.

The BPP application 184, which supports the bill presentment UI 210 and payment UI 240, can be configured to integrate with commercially available personal finance manager (PFM) software, such as the PFM program "Money" produced by Microsoft Corporation. The BPP application 184 can also be configured to integrate with bill analysis software or business accounting software (e.g., Peachtree, SAP, etc.) which permits automatic posting of accounting/transaction data while the bill is being paid. The BPP application 184 can be further configured to transfer data to other applications executing on the consumer's computing unit, such as a spreadsheet application like Excel from Microsoft Corporation.

As an alternative, the bill itself might contain executable code that allows a consumer to analyze the bill or obtain greater understanding of one bill, or a bundle of bills. For example, the bill might contain executable code similar to the auto calculate feature in the Excel spreadsheet program in which the consumer can select certain items and the bill computes in response a temporary value (e.g., sum, max, min, etc.) using only the selected items.

Accordingly, the payment process is beneficial to both parties. The biller initiates the payment process by submitting a bill that is automatically designed to be paid back to its own coffers in a format the biller's systems already understand and for which no changes are required. The consumer is in complete control of the payment timing and amount, having exclusive authority to overpay, make full or partial payment, or to forego payment altogether.

After the consumer has filled out the payment instruction, the data for the payment and remittance information is associated through the data structure 190 (step 160 in FIG. 5). That is, the payment amount in data field 196 and payment date in data field 198 are linked inherently through the data structure to the payee in data field 192 and the consumer account number in data field 194. The consumer can select the payment account for data field 194. For instance, the consumer may have more than one account, including checking accounts and savings accounts. A bill could be paid from any of these accounts at the consumer's discretion. The account designated by the consumer is included in the payment instruction.

With reference again to FIG. 4 and to step 162 in FIG. 5, the consumer computing unit 114 transmits the remittance information 130 directly back to the biller 112 via network 116 (as represented by arrow 134 in FIG. 4). The consumer computing unit 114 uses the biller's network address in address data field 204 of the data structure 190 to electronically route the payment remittance information 130 to the biller. Routing can be achieved in a variety of ways, including email, Internet URL addresses, and so forth. Since the payment remittance information was created by the biller in a particular format, and the consumer only filled in certain data fields, the payment remittance information 130 remains in the biller prescribed format for seamless integration to the biller's existing accounting system. Moreover, the payment remittance information is automatically returned to the biller without intervention by the consumer, except that the amount to be paid and the payment date are appended. The consumer may also attach any additional information, such as remittance advice notes, or text messages relating to disagreements with invoice information or disputes over specific charges, or change of address data, or any communication with customer service representatives at the biller.

If the consumer selected any offering in the bill, such as through an advertisement or the like, the remittance information will also include this data. For example, suppose the bill includes an advertisement for a new service and offers three free months as an incentive to add the service. If the consumer clicks to accept the service, the consumer's name and address are returned with the remittance information. This demographic information can then be used by the biller or offered to third parties for future advertisement within the bill to target market specific consumers.

The consumer computing unit 114 also transmits payment instructions (PI) 140 to initiate payment of the bill (step 164 in FIG. 5). The payment instructions include the amount to be paid, the consumer's method of payment, and any bank account numbers to draw against. The payment instructions may optionally include an authorization to permit the consumer's bank to withdraw the funds from the consumer's account to cover payment. This authorization can be set up during a registration stage when the consumer initially signs up for the service. By virtue of this pre-arrangement, the consumer authorizes the biller (through the biller's bank) to issue debits against the customers' account at the customer's bank. In the FIG. 4 implementation, the payment instructions 140 are sent back to the biller 112 over the network 116. Although shown separately, the payment instructions 140 and remittance information 130 are sent together as a single message, although they may be sent separately.

It is noted that the biller and consumer computing units can be configured to encrypt the bill 128, remittance information 130, and payment instructions 140 prior to dispatch over the network. The Internet, for example, is an insecure network that is open to eavesdroppers. Conventional cryptographic ciphers can be used to encode the financially sensitive data for protection over the network. Additionally, digital signatures can be used as a means for authenticating the parties, and providing integrity that the messages actually originated from the parties and have not been subsequently altered. A more detailed discussion of a computer implemented encryption and signing system can be found in a U.S. patent application Ser. No. 08/496,801, filed Jun. 29, 1995, entitled "Cryptography System and Method for Providing Cryptographic Services for a Computer Application," by Terrence Spies et al., and assigned to Microsoft Corporation. This application is hereby incorporated by reference. For additional information on cryptography and digital signing, the reader is directed to a text written by Bruce Schneier and entitled "Applied Cryptography: Protocols, Algorithms, and Source Code in C," published by John Wiley & Sons with copyright 1994 (second edition 1996), which is hereby incorporated by reference.

At step 166 in FIG. 5, the accounts for the consumer and biller are settled using the settlement subsystem of the bill presentment and payment system 110. In the FIG. 4 implementation, the biller 112 forwards the payment instructions onto the biller bank 122 (as represented by arrow 136 in FIG. 4). The biller bank 122 requests settlement with the consumer bank 124 via the clearing network 126. As an example, the biller bank 122 submits an ACH debit transaction which debits the consumer's account in consumer bank 124 for the amount of the payment authorized by the consumer (as represented by arrow 138 through clearing network 126). Other specifics of the transaction or special case situations, such as funds reversals, are handled in conventional manner which are well understood in the art and are not described herein.

The FIG. 4 implementation is beneficial in that the bill presentment and payment process is conducted entirely electronically. Paper bills, conventional mail services, and envelop opening and encoding tacks are completely eliminated. Another benefit is that the biller customizes the type and format of remittance information that it wants returned rather than conforming to a foreign format dictated by a bank, network, or other third party. This enables the biller to integrate the payment remittance and presentment software with its existing accounting software with minimal cost or interruption. The biller is responsible for initiating the billing process, while the consumer is empowered with the authority to decide when and how much is paid. Another benefit is that the system is compatible with existing clearing networks, such as the ACH network. Billers that already have an existing direct debit offering can piggyback ACH transactions from this system with minimal additional changes. Another benefit of the bill presentment and payment system described herein in comparison to a prior art direct debit system is that the biller and consumer can change banks independent of each other. Each party can simply register with a new bank, obtain new account numbers, and start using them without requiring changes by or creating difficulties for the other party.

Figure 11:
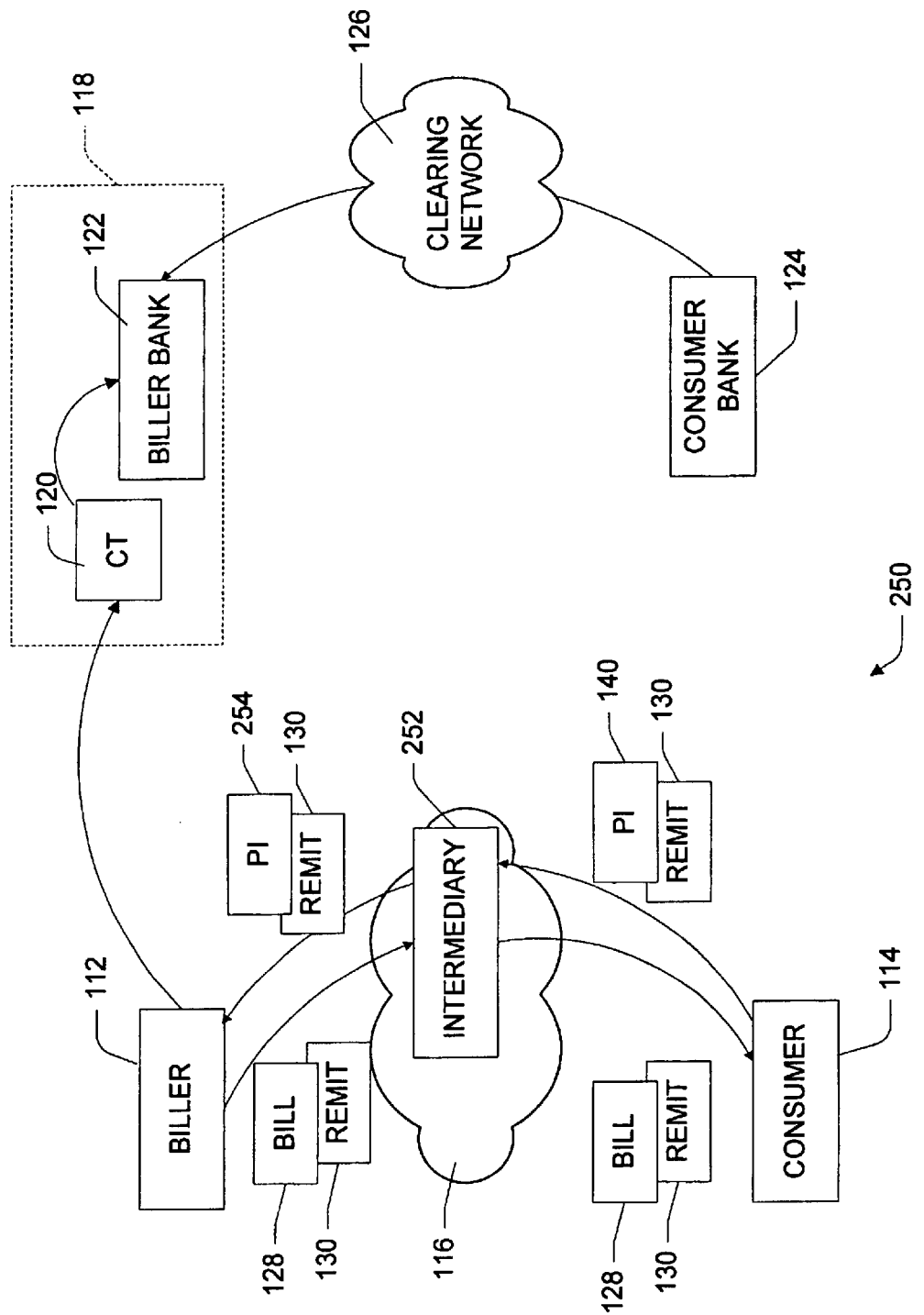
FIG. 11 is a diagrammatic illustration of a bill presentment and payment system according to another implementation of this invention.

FIG. 11 shows another implementation of a bill presentment and payment system in accordance with the invention, which is referenced generally by number 250. System 250 differs from the system 110 described with respect to FIG. 4 in that an intermediary 252 is interposed between the biller 112 and consumer 114. The intermediary 252 is a bill presentment and payment remittance service provider that handles billing responsibilities for the biller and payment instructions remitted back from the consumers. The intermediary 252 acts as a centralized bill warehouse and delivery mechanism that offers one gathering place for both billers and consumers. The intermediary 252 is equipped with a computing unit that is programmed to electronically handle the bills, remittance information, payment instructions, and staging and delivery instructions on behalf of many different billers and many different consumers. The intermediary functions can also be split among multiple entities. For example, one company can stage the bills and another company can handle the remittance processing. Other arrangements for handling the intermediary functions are also possible.

The biller 112 sends bill 128 and remittance information 130 to the intermediary 252 for staging. The intermediary 252 transfers the bill and remittance information to the appropriate consumers 114 at the prescribed billing times. Alternatively, the consumer 114 can periodically access the intermediary 252 for bills in his/her name or account number. The electronic transmission is carried out over the network 116.

The consumer reviews the bill, and if acceptable, authorizes payment. In the same manner as described above, the consumer enters the payment amount and date using the payment UI, and submits the remittance information 130 and payment instructions 140 back to the intermediary 252 over the network 116. Remittance information bound for a specific biller is pooled by the intermediary 252 and sent to that biller in batch. The intermediary 252 also produces payment instructions 254 that are in a file compatible with the clearing network 126. For instance, the PI254 might be in the form of an ACH-ready file used to settle accounts in ACH networks.

The biller 112 passes the payment instructions onto a concentrator 120 or biller bank 122. The biller bank 122 submits a debit transaction using the clearing payment instructions generated by the intermediary 252 to debit the consumer's account in consumer bank 124 for the amount of the payment authorized by the consumer.

Figure 12:
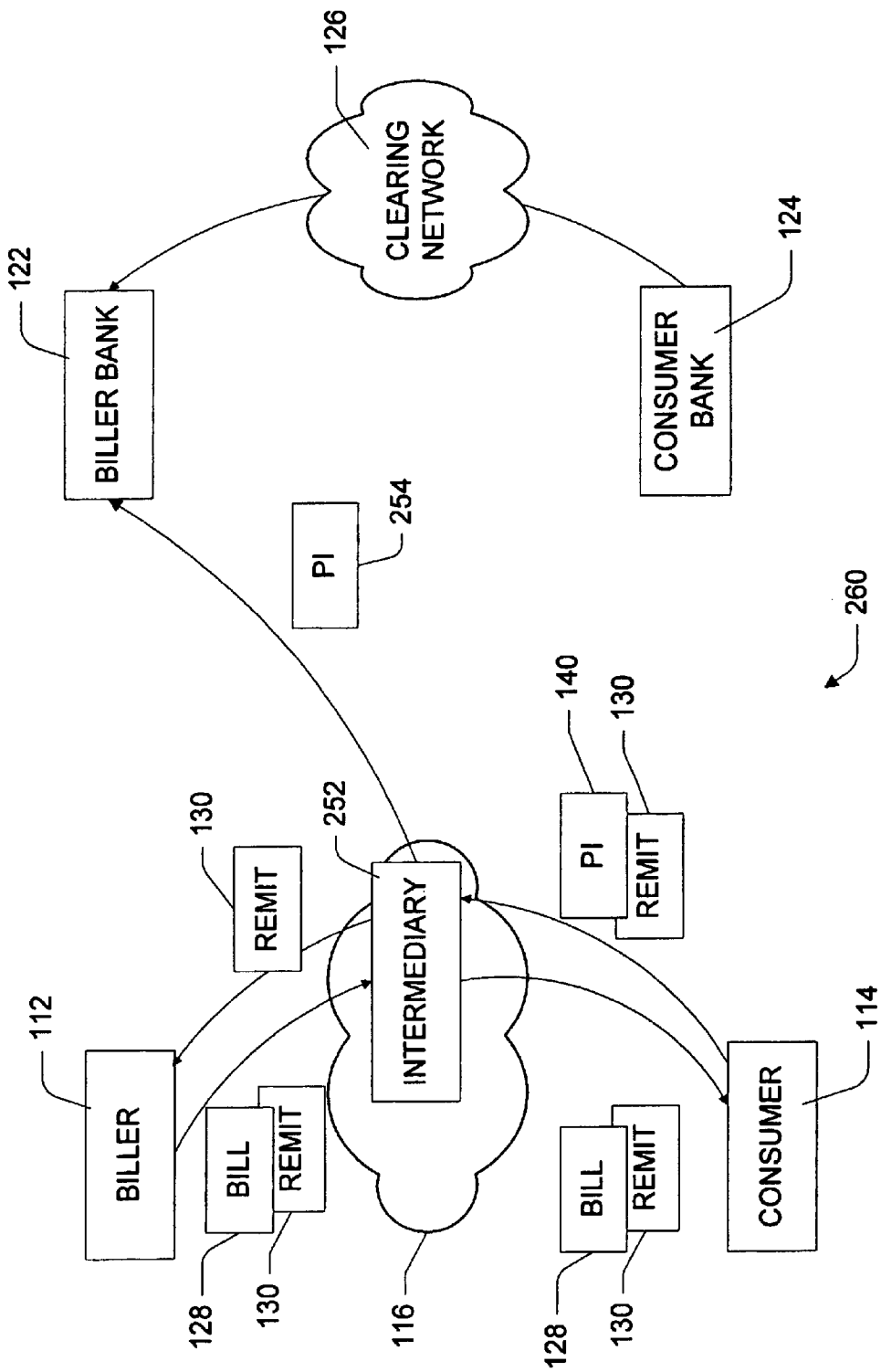
FIG. 12 is a diagrammatic illustration of a bill presentment and payment system according to still another implementation of this invention.

FIG. 12 shows another implementation of a bill presentment and payment system in accordance with the invention, which is referenced generally by number 260. System 260 is essentially the same as system 250 described above with respect to FIG. 11, with the primary difference being that the intermediary 252 sends the payment instructions (PI) 254 directly to the biller bank 122 as opposed to the biller 112. This eliminates having the biller handle the payment instruction file. In a variation of this implementation, the intermediary can be configured to submit the payment instructions directly, or through its own bank (not shown), to the clearing network 126.

In compliance with patent statutes, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. In an electronic bill presentment and payment remittance system, a method for electronically presenting a bill to a consumer and for electronically remitting a payment of the bill from the consumer, comprising the following steps:
    generating a bill and associated payment remittance information at a biller, the payment remittance information being arranged within a data structure according to a format prescribed by the biller, the data structure having one or more open data fields to hold data that a consumer can enter or alter and one or more closed data fields to hold data that the consumer cannot alter, the remittance information further including hidden structured remittance data that is kept hidden from the consumer;
    electronically transmitting the bill and associated payment remittance information to the consumer;
    displaying a bill presentment user interface (UI) on a visual display, the bill presentment UI including items with predefined dispute reasons expressing possible reasons why the consumer might wish to challenge a particular item on the bill;
    enabling the consumer to:
        select a particular predefined dispute reason for a particular item on the bill; and
        authorize electronic payment of the bill;
    associating with the payment remittance information:
        the particular predefined dispute reason for the particular item; and
        the electronic payment;
    transmitting the payment remittance information, including the structured remittance data, from the consumer back to the biller in the format prescribed by the biller.

2. A method as recited in claim 1, further comprising the step of automatically adjusting an amount owed for the particular item on the bill to reflect the selection by the consumer of the particular predefined dispute reason.

3. A method as recited in claim 1, further comprising the step of providing one or more dialog boxes which the consumer can open from the bill presentment UI to enter an explanation as to why the particular item is being challenged.

4. A computer-readable medium having computer-executable instructions which direct a computer to perform a method for electronically presenting a bill to a consumer and for electronically remitting a payment of the bill from the consumer, the method comprising:
    generating a bill and associated payment remittance information at a biller, the payment remittance information being arranged within a data structure according to a format prescribed by the biller, the data structure having one or more open data fields to hold data that a consumer can enter or alter and one or more closed data fields to hold data that the consumer cannot alter, the remittance information further including hidden structure remittance data that is kept hidden from the consumer;
    electronically transmitting the bill and associated payment remittance information to the consumer;
    displaying a bill presentment user interface (UI) on a visual display, the bill presentment UI including items with predefined dispute reasons expressing possible reasons why the consumer might wish to challenge a particular item on the bill;
    enabling the consumer to:
        select a particular predefined dispute reason for a particular item on the bill; and
        authorize electronic payment of the bill;
    associating with the payment remittance information:
        the particular predefined dispute reason for the particular item; and
        the electronic payment;
    transmitting the payment remittance information, including the structured remittance data, from the consumer back to the biller in the format prescribed by the biller.

5. In an electronic bill presentment and payment remittance system, a method for electronically presenting a bill to a consumer and for electronically remitting a payment of the bill from the consumer, comprising the following steps:
    generating a bill and associated payment remittance information at a biller, the payment remittance information being arranged within a data structure according to a format prescribed by the biller, the data structure having one or more open data fields to hold data that a consumer can supply or alter and one or more closed data fields to hold data that the consumer cannot alter, the payment remittance information further including structured remittance data that is kept hidden from the consumer;
    electronically transmitting a bill and associated payment remittance information from the biller to at least one intermediary;
    electronically transmitting the bill and payment remittance information from the intermediary to the consumer;
    displaying to the consumer a bill presentment user interface (UI) on a visual display, the bill presentment UI:
        including the bill with items thereon associated with predefined dispute reasons expressing possible reasons why the consumer might wish to challenge a particular item on the bill; and
        not including the structured remittance data; enabling the consumer to:
        select a particular predefined dispute reason for a particular item on the bill; and
        specify payment instructions which include at least one of a payment amount and a payment date;
    electronically transmitting the payment instructions, the particular predefined dispute reason for the particular item, and payment remittance information from the consumer to the intermediary;
    electronically transmitting the payment remittance information, including the structured remittance data and the particular predefined dispute reason for the particular item, from the intermediary back to the biller in the format prescribed by the biller; and settling accounts between the consumer and biller using the payment instructions.

6. A computer-readable medium having computer-executable instructions which direct a computer to perform a method for electronically presenting a bill to a consumer and for electronically remitting a payment of the bill from the consumer, the method comprising:

generating a bill and associated payment remittance information at a biller, the payment remittance information being arranged within a data structure according to a format prescribed by the biller the data structure having one or more open data fields to hold data that a consumer can supply or alter and one or more closed data fields to hold data that the consumer cannot alter, the payment remittance information further including structured remittance data that is kept hidden from the consumer;

electronically transmitting a bill and associated payment remittance information from the biller to at least one intermediary;

electronically transmitting the bill and payment remittance information from the intermediary to the consumer;

displaying to the consumer a bill presentment user interface (UI) on a visual display, the bill presentment UI:
including the bill with items thereon associated with predefined dispute reasons expressing possible reasons why the consumer might wish to challenge a particular item on the bill; and
not including the structured remittance data;

enabling the consumer to:
select a particular predefined dispute reason for a particular item on the bill; and
specify payment instructions which include at least one of a payment amount and a payment date;

electronically transmitting the payment instructions, the particular predefined dispute reason for the particular item, and payment remittance information from the consumer to the intermediary;

electronically transmitting the payment remittance information, including the structured remittance data and the particular predefined dispute reason for the particular item, from the intermediary back to the biller in the format prescribed by the biller; and settling accounts between the consumer and biller using the payment instructions.

7. In an electronic bill presentment and payment remittance system for electronically presenting a bill to a consumer and for electronically remitting a payment of the bill from the consumer, the system including a network, a biller computing unit with computer-readable medium, and a consumer computing unit with computer readable medium the computer-readable media having computer-executable instructions for performing steps comprising:

operatively linking the biller computing unit and the consumer computing unit to the network;

generating a bill and associated payment remittance information in a particular format at the biller computing unit, the remittance information including structured remittance data that is kept hidden from the consumer;

transmitting the bill and payment remittance information over the data network from the biller computing unit to the consumer computing unit;

receiving the bill and payment remittance information at the consumer computing unit;

presenting the bill to the consumer a bill presentment user interface (UI) on a visual display, the bill presentment UI:
including items on the bill associated with predefined dispute reasons expressing possible reasons why the consumer might wish to challenge a particular item on the bill; and
not including the structured remittance data;

facilitating entry of payment instructions by the consumer at the consumer computing unit including:
a particular predefined dispute reason for a particular item on the bill; and
at least one of a payment amount and a date;

following said entry, automatically routing the payment remittance information, including the structured remittance data and the particular predefined dispute reason for the particular item, in the particular format to the biller computing unit.

* * * * *

UNITED STATES PATENT AND TRADEMARK OFFICE
CERTIFICATE OF CORRECTION

| | | |
|---|---|---|
| PATENT NO. | : 6,968,319 B1 | Page 1 of 1 |
| APPLICATION NO. | : 09/459219 | |
| DATED | : November 22, 2005 | |
| INVENTOR(S) | : Darren B. Remington et al. | |

It is certified that error appears in the above-identified patent and that said Letters Patent is hereby corrected as shown below:

In column 1, line 4, below "CAPABILITIES" insert -- RELATED APPLICATIONS --.

In column 18, line 8-9, in Claim 4, delete "structure" and insert -- structured --, therefor.

In column 19, line 14, in Claim 6, after "biller" insert -- , --.

In column 20, line 11, in Claim 7, after "medium" insert -- , --.

Signed and Sealed this
Twenty-fifth Day of January, 2011

David J. Kappos
*Director of the United States Patent and Trademark Office*